United States Patent [19]

Murakami

[11] Patent Number: 4,625,932
[45] Date of Patent: Dec. 2, 1986

[54] REAR DRAG TYPE SPINNING REEL

[75] Inventor: Hideo Murakami, Hiroshima, Japan

[73] Assignee: Ryobi Ltd., Hiroshima, Japan

[21] Appl. No.: 689,275

[22] Filed: Jan. 7, 1985

[30] Foreign Application Priority Data

Jan. 16, 1984 [JP] Japan .................... 59-3915[U]

[51] Int. Cl.$^4$ .............................................. A01K 89/02
[52] U.S. Cl. .............................. 242/84.51 A; 384/146; 384/439
[58] Field of Search ............... 242/84.5 P, 84.5 A, 242/84.5 R, 84.51 A, 84.51 R, 84.21 R, 217, 219; 384/439, 146

[56] References Cited

U.S. PATENT DOCUMENTS

| 1,783,446 | 12/1930 | Overbury | 384/439 |
| 2,687,855 | 8/1954 | Shakespeare et al. | 242/84.5 P |
| 3,233,846 | 2/1966 | Polevoy | 242/217 |
| 4,238,085 | 12/1980 | Jansson et al. | 242/84.5 P |
| 4,391,419 | 7/1983 | Uwama et al. | 242/84.5 P |
| 4,434,951 | 3/1984 | Nakajima | 242/84.52 B |

FOREIGN PATENT DOCUMENTS 179039 4/1962 Sweden .................. 242/84.21 R

Primary Examiner—Billy S. Taylor
Attorney, Agent, or Firm—Sughrue, Mion, Zinn, Macpeak & Seas

[57] ABSTRACT

A spinning reel of the rear drag type having greatly improved durability has a reel body made of plastic with a recess portion formed at a rear end thereof, and a fitting through-hole formed in a bottom wall of the recess portion. A spool shaft passes through the through-hole in the bottom wall. A click receiver made of metal and having a washer receiving flange at one end thereof is engaged with the reel body, the click receiver being fitted in the through-hole and fitted around the spool shaft so as to be slidable but not rotatable with respect thereto. A click member is fitted on the spool shaft for rotation therewith and is received within the click receiver, and a plurality of drag washers are fitted around the spool shaft abutting the click member. A drag mechanism applies an adjustable force to the drag washers.

2 Claims, 3 Drawing Figures

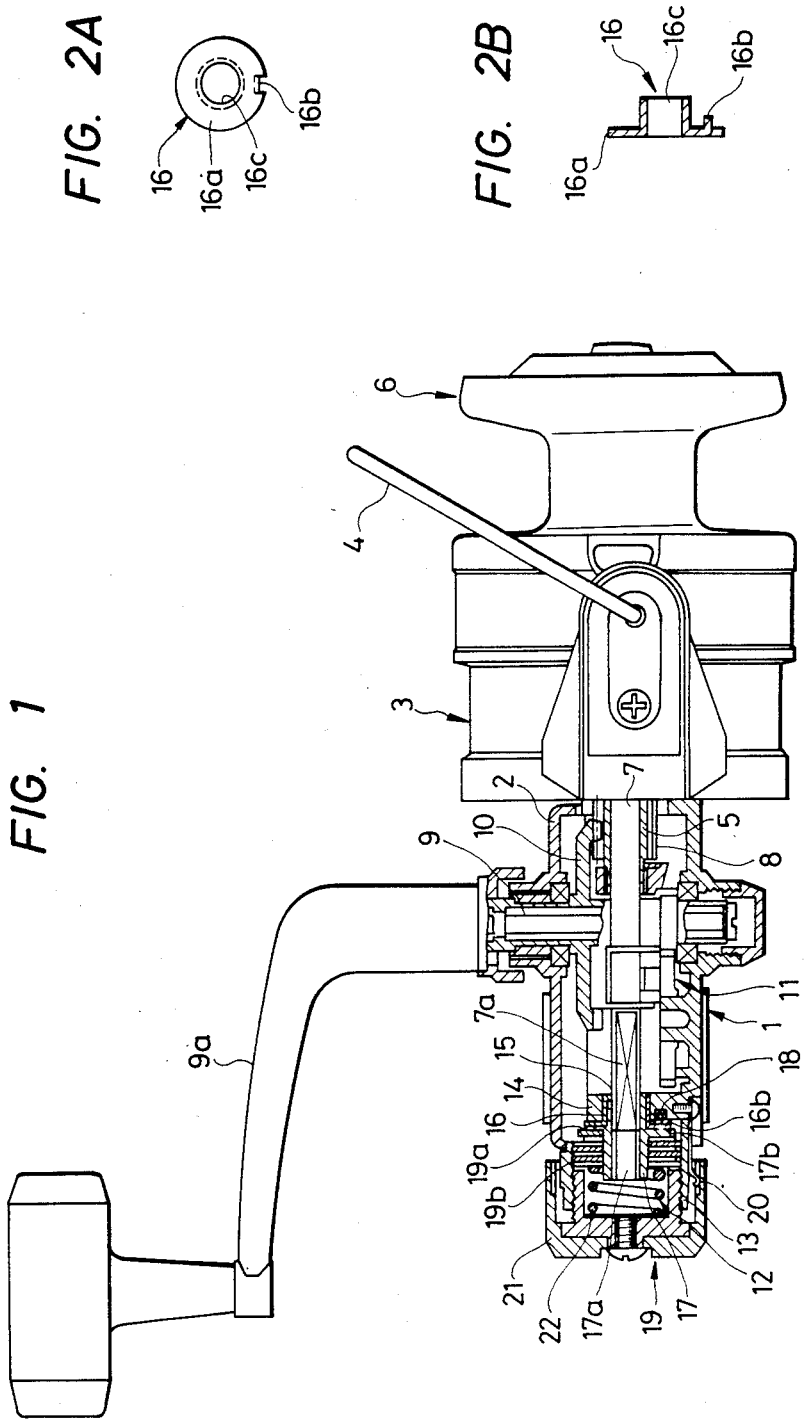

REAR DRAG TYPE SPINNING REEL

BACKGROUND OF THE INVENTION

The present invention relates to a spinning reel of the rear drag type wherein a spool is journaled to a reel body so as to be rotatable and slidable reciprocally and a spool shaft extends to a rear portion of the reel body where a drag mechanism is provided. Particularly, the invention relates to a spinning reel of the rear drag type wherein the reel body is made of plastic.

In the conventional spinning reel of the rear drag type, an example of which is described in U.S. Pat. No. 4,391,419, a fitting through-hole is formed in a bottom wall of a recess portion for receiving drag washers, which recess portion is provided at a rear portion of a reel body made of plastic. A click member is directly fitted into the fitting through-hole and is fitted to a spool shaft so as to be slidable but not rotatable in the longitudinal direction of the shaft.

However, in the thus-constructed spinning reel, because the drag washers are pressed to the bottom wall of the drag washer receiving recess portion of the reel body by a drag spring, the reel body of plastic has a tendency to wear remarkably due to the sliding contact of the click member and the drag washers, which are made of metal. Thus, the durability of the conventional reel was very poor.

SUMMARY OF THE INVENTION

An object of the present invention is to obviate the above-described drawbacks of the conventional spinning reel of the rear drag type.

Another object of the invention is to provide a spinning reel of the rear drag type having an improved durability drag mechanism portion.

In accordance with the above and other objects, the invention provides a spinning reel of a rear drag type, comprising a reel body made of plastic, the reel body having a recess portion formed at a rear end thereof, a fitting through-hole being formed in a bottom wall of the recess portion; a spool shaft passing through the through-hole in the bottom wall; a click receiver made of metal and having a washer receiving flange at one end thereof engaged with the reel body, the click receiver being fitted in the through-hole and fitted around the spool shaft so as to be slidable but not rotatable with respect thereto; a click member rotatably fitted on the spool shaft and engaged with the click receiver; a plurality of drag washers fitted around the spool shaft and abutting the click member; and a drag mechanism for applying an adjustable force to the drag washers.

BRIEF DESCRIPTION OF THE DRAWINGS

FIG. 1 is a partially cut-away side view of a spinning reel of a rear drag type according to the present invention; and FIGS. 2A and 2B are a plan view and a cross sectional side view, respectively, showing a click receiver of the spinning reel of FIG. 1.

DESCRIPTION OF THE PREFERRED EMBODIMENTS

An exemplary embodiment of the present invention will be explained referring to FIG. 1.

A reel body 1 is formed of a thermosetting plastic material. A frame 2, which is fixed to an opening portion at one side of the reel body 1 by a screw, is also formed of a thermosetting plastic material. At a front end portion of the reel body 1, a rotor 3 having a bail arm 4 is rotatably supported by a tubular shaft 5. A spool 6 is fixedly mounted to a front end portion of a spool shaft 7, which is received in a through-hole of the tubular shaft 5 so that the spool 6 is rotatable and slidable in the longitudinal direction of the shaft 5. A pinion 8 formed at an outer periphery of the shaft 5 is engaged with a main gear 10 of a handle shaft 9, which is rotatably supported by the reel body 1 and the frame 2. The spool shaft 7 is interlinked with the main gear 10 through an oscillating mechanism 11.

In this construction, when both the handle shaft 9 and the main gear are rotated by rotating a handle 9a, the rotor 3 is rotated and also the spool 6 is reciprocated in the longitudinal direction of the tubular shaft 5 so that a fishing line (not shown) hooked by the bail arm 4 is wound around the spool 6.

At a rear end portion of the reel body 1, a threaded sleeve 13 is provided which is screwed into the body 1 so as to protrude therefrom. The threaded sleeve 13 forms a recess portion 12, having an opening at a rear portion thereof, in which is received a drag washer. At a bottom wall 14 of the recess portion 12 is provided a fitting through-hole 15 such that a center thereof is on an extended line of the center of the spool shaft 7.

A click receiver 16 made of metal and having a cylindrical configuration is provided, as shown in FIGS. 2A and 2B, at one end with a tab 16b which is fitted into a recess 18 to prevent the click receiver 16 from rotating. A click member 17 is provided having a central sleeve portion rotatably fitted into a central through-hole 16c of the click receiver 16 such that the click member 17 is not rotatable with respect to the spool shaft 7 but is slidable in the longitudinal direction thereof.

A rear end portion 7a of the spool shaft 7 has a polygonal cross section. The central through-hole 17a of the click member 17 is formed so as to have a cross section similar to that of the rear end portion 7a. The rear end portion 7a of the spool shaft 7 is fitted into the central through-hole 17a to thereby prevent the rotation of both the click member 17 relative to the rear end portion 7a but to permit sliding movement in the longitudinal direction.

In a drag mechanism 19, a drag washer 19a is disposed between a washer receiving flange 16a of the click receiver 16 and a gear portion 17b of the click member 17, and a plurality of drag washers 19b are disposed at an outer side (left side in FIG. 1) of the gear portion 17b. Further, a drag spring 22 is disposed between an outermost one of the drag washers 19b and a drag knob 21, which is threadedly engaged with the threaded sleeve 13 through a click stop 20, thereby applying a stress to the drag washers 19b to urge the click member 17 into contact with the drag washer 19a. The amount of force applied from the drag spring 22 can be adjusted by adjusting the relative position of the drag knob 21 with respect to the threaded shaft 13 to thereby control the amount of reverse rotation of the spool 6.

As described above, in a spinning reel of the rear drag type according to the present invention, the click receiver 16 made of metal is provided with the washer receiving flange 16a at one end thereof. The fitting through-hole 15 is formed in the bottom wall 14 of the receiving recess portion 12 for receiving the drag washers 19a and 19b which are disposed at the rear end portion of the reel body 1 made of plastic. The click receiver 16 is fitted into the fitting through-hole 15 in such a manner as to prevent rotation of the click receiver 16. The washer receiving flange 16a abuts the bottom wall 14. Further, the click member 17 is fitted into the through-hole of the click receiver 16 so that the click member 17 is not rotatable with respect to the spool shaft 7 but is slidable in the longitudinal direction thereof.

With this construction, the drag washer 19a to which there is applied a stress by the drag spring 22 is urged toward the washer receiving flange 16a. Further, the click member 17 is rotatable in the through-hole of the click receiver 16. Thus, neither the drag washer 19a nor the click member 17 slide on the surface of the bottom wall 14 nor do they rotate in the fitting through-hole 15 of the bottom wall. Thus, not only is the thermal resistance but also the wear resistance of both the bottom wall 14 and the inner wall of the fitting through-hole 15 improved, thereby improving the overall durability of the reel. Further, both the surface of the bottom wall 14 and the inner wall of the fitting through-hole 15 are prevented from wearing unevenly so that the force applied to the click member 17 from the drag spring 22 can be adjusted accurately and smoothly, and also fine adjustment of this force can be performed.

I claim:

1. A spinning reel of the rear drag type, comprising; a reel body made of plastic, said reel body having a recess portion formed at a rear end thereof, a fitting through hole formed in a bottom wall of said recess portion, a spool shaft passing through said through hole in said bottom wall, a click receiver made of metal and having a washer engaging flange at one end thereof in contact with said reel body, said click receiver being fitted in said through hole and including a non-rotatable hub portion, a click member fitted on said spool shaft and rotatable with respect to said click receiver, a plurality of drag washers abutting said click member, said click member including a first rotatable sleeve portion received within said click receiver, a flange, and a second sleeve portion disposed on a side of said flange distant from said flange of said click receiver, for passing through and supporting said drag washers, said click member being mounted so as to be axially slidable on said spool shaft but rotatably fixed to said spool shaft and including an integral gear portion; spring means for biasing said drag washers against said flange of said click member; said click receiver including a tab portion provided at one end thereof, said bottom wall including a recess for receiving said tab portion to prevent rotation of said click receiver, and a further drag washer disposed between said flange of said click receiver and said flange of said click member in a manner such that said click member is slidable and rotatable with respect to said further drag washer, and a drag mechanism for applying an adjustable force to said drag washers.

2. The spinning reel of claim 1, wherein said spool shaft has a polygonal cross section, and wherein said click member has an inner shaft receiving surface conforming to said cross section.

* * * * *